Oct. 23, 1934.   T. J. HEAVEY   1,977,629
TRIPOD FOR MACHINE GUNS
Filed Nov. 2, 1932   2 Sheets-Sheet 1
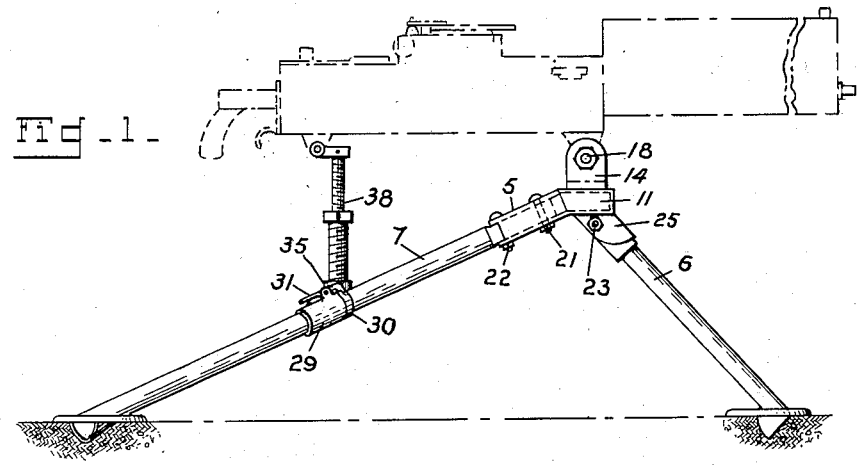
Fig. 1.
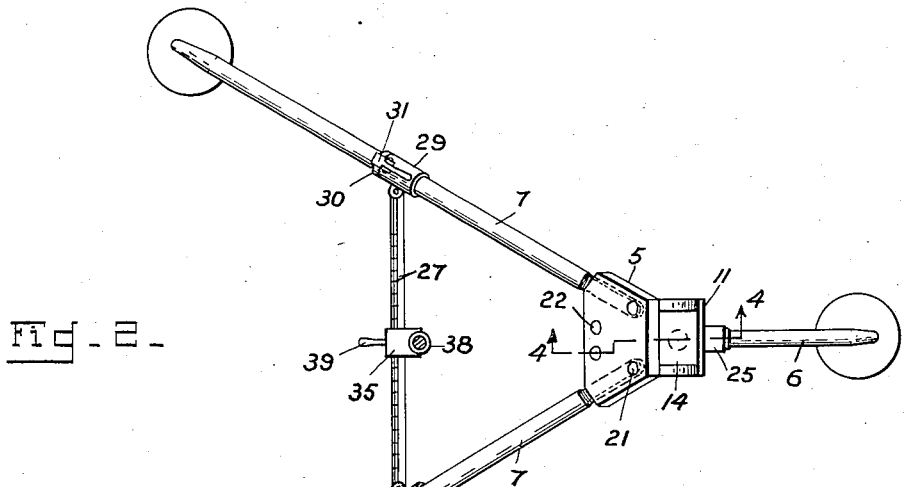
Fig. 2.
Fig. 3.
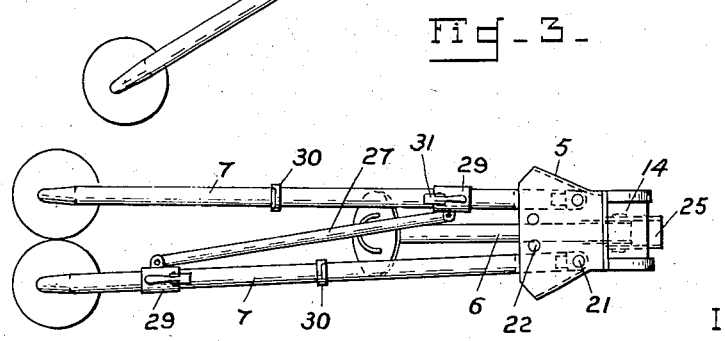
Inventor
Thomas J. Heavey
By W. N. Roach
Attorney Oct. 23, 1934. T. J. HEAVEY 1,977,629
TRIPOD FOR MACHINE GUNS
Filed Nov. 2, 1932 2 Sheets-Sheet 2
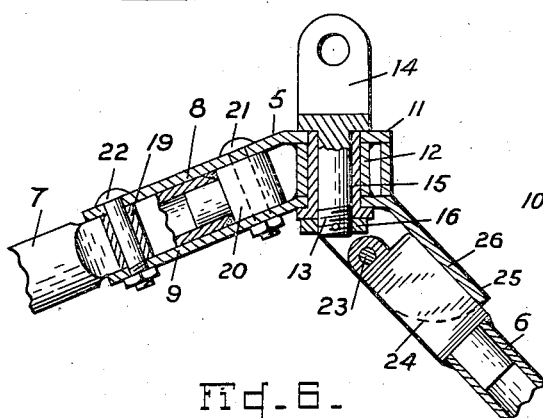
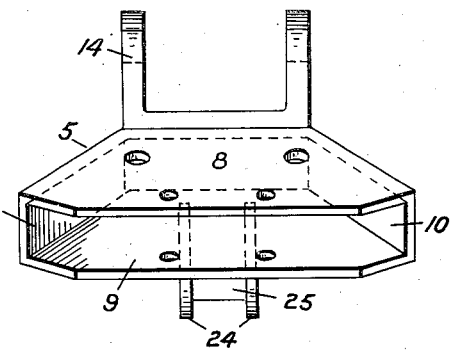
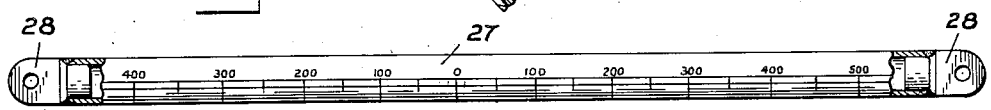
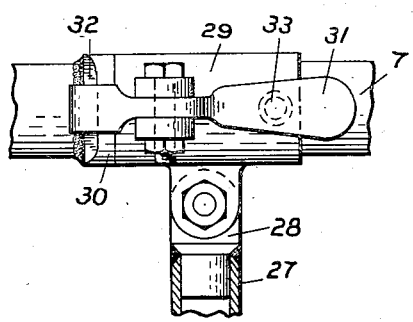
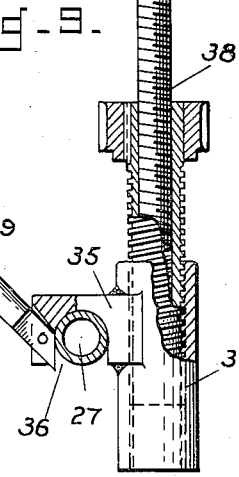
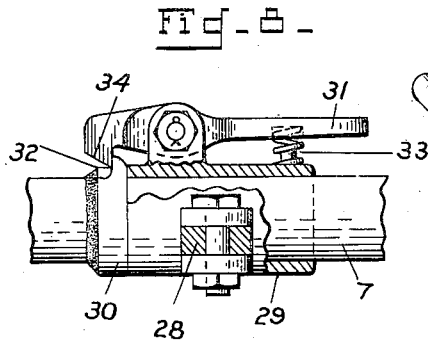
Inventor
Thomas J. Heavey
By W. N. Roach
Attorney Patented Oct. 23, 1934

1,977,629

UNITED STATES PATENT OFFICE 1,977,629

TRIPOD FOR MACHINE GUNS

Thomas J. Heavey, United States Army, Fort Riley, Kans.

Application November 2, 1932, Serial No. 640,859

7 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a tripod for machine guns and an improvement on the light tripod shown in U. S. Patent No. 1,372,599 on March 22, 1921. In the patent the tripod is intended to be more or less permanently associated with the gun and to be easily and quickly folded against the gun for the purpose of transportation.

The improvements of the present invention are directed to a novel tripod head and to a traversing bar and elevating mechanism.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the improved tripod attached to a machine gun.

Fig. 2 is a plan view of the tripod in extended position.

Fig. 3 is a plan view of the tripod in folded position.

Fig. 4 is a sectional view through the tripod head.

Fig. 5 is a view in rear elevation of the tripod head.

Fig. 6 is a detail view of the traversing bar.

Fig. 7 is a plan view or the traversing bar latch.

Fig. 8 is a view in side elevation, partly in section of the latch and

Fig. 9 is a view partly in side elevation and partly in section of the elevating mechanism.

The tripod consists generally of a head 5 to which are pivotally attached a front leg 6 and a pair of rear or trail legs 7—7.

The head is in the form of a casing Figs. 4 and 5 having spaced top and bottom plates respectively 8 and 9 and side plates 10—10. The front portion 11 is provided with a socket 12 adapted to receive a pintle 13 on a yoke 14. A bushing 15 is placed in the socket and the pintle when inserted therethrough is retained by means of a nut 16. The yoke is attached to a gun 17 by means of a trunnion pin 18 (Fig. 1).

The rear portion 19 is inclined with respect to the front portion 11 and receives the flattened ends of the rear legs 7. As shown in Fig. 4 the connection is effected by means of a plug 20 secured in the end of the leg and receiving a bolt 21 passing through the top and bottom plates 8 and 9. The legs are movable laterally in the same plane and are limited in this movement by means of the side plates 10 of the casing and by a pair of spaced bolts 22—22 (Figs. 2 and 4) secured to the top and bottom plates 8 and 9.

The front leg is mounted on a pin 23 passing through the cheeks 24 of a bracket 25 that is secured to the bottom plate 9 of the front portion 11 of the head and is inclined with respect thereto. The under side of the bracket is open to enable the leg to be moved rearwardly underneath the rear legs while the upper side is closed by a plate 26 to support the front leg when the tripod is open.

A traversing bar 27 has a pivotal connection 28 at each end with sleeves 29 embracing the rear legs. The sleeves are mounted to slide in opposite directions, the right sleeve movable to the rear end of its leg and the left sleeve movable to the front end of its leg. Movement of the sleeves is limited by a stop collar 30 positioned approximately at the center of each leg.

A latch 31 pivotally carried by each of the sleeves is engageable with a notch 32 in the stop collar and serves to hold the sleeve against sliding movement on the leg. A coil spring 33 maintains the latch in normal locking position and a beveled face 34 on the latch permits it to ride over the stop collar.

A block 35 (Fig. 9) having a U-shaped opening 36 whereby it may be positioned on the traversing bar 27, carries the barrel 37 of a screw elevating mechanism 38 that is pivotally attachable to the rear end of the gun. A clamping handle 39 pivotally mounted in the block is adapted to be moved into engagement with the bar 27 to prevent sliding movement of the block 35.

When a straight traversing bar is employed, the elevating mechanism will be inclined as it is moved laterally. This will result in a slight change in the angle of elevation of the gun. Where such a change is objectionable the traversing bar will obviously be curved on an appropriate arc. When the gun and tripod are to be transported as a unit, the block 35 is removed from the traversing bar, which is then moved towards parallelism with the rear legs as in Fig. 3. The front leg and the elevating mechanism are then folded alongside the rear legs. The legs may be strapped to the gun in any approved manner.

The operations involved in folding and unfolding the tripod may be easily and quickly performed.

The present tripod while being of light weight possesses considerable strength and affords sufficient stability to permit the accurate delivery of indirect fire.

I claim:

1. In combination with a machine gun, a tripod therefore including a head, a yoke vertically pivoted to the head, means for trunnioning the gun on the yoke, a front leg pivotally secured to the head, a pair of rear legs pivotally secured to the head, a sleeve slidable on each rear leg, a bar pivotally secured to the sleeves, means for locking the sleeves against movement, and an elevating mechanism pivotally secured to the gun and including a quick-detachable coupling unit for engaging the bar.

2. In a mount for guns, a pair of rear legs foldable in a common plane, a sleeve on each rear leg, the sleeves on the two legs slidable in opposite directions from an approximately central point, means carried by each sleeve and engageable with the corresponding leg for locking the sleeve against movement, and a bar pivotally secured to the sleeves.

3. In a mount for guns, a pair of rear legs foldable in a common plane, a sleeve on each rear leg, the sleeves on the two legs slidable in opposite directions from an approximately central point, means for locking the sleeve against movement, and a bar pivotally secured to the sleeves.

4. In a tripod for a gun, a casing having top and bottom plates, a gun-supporting member vertically pivoted in the front part of the casing, a pair of trail legs insertable in the rear part of the casing and mounted for movement in a common plane, a bracket secured to the bottom plate of the front part of the casing, and a front leg mounted in the bracket and movable into parallelism with the trail legs.

5. In a tripod for a gun, a casing having top and bottom plates, a gun-supporting member vertically pivoted in the front part of the casing, a pair of trail legs insertable in the rear part of the casing and mounted for movement in a common plane, and a front leg mounted on the front part of the casing.

6. In a mount for guns, a pair of trail legs foldable in a common plane, a bar connecting the trail legs and foldable between said legs, a gun connection including a block having a U-shaped opening whereby it is mounted on the bar for traversing movement, and a clamp on the block for engaging the bar.

7. In a mount for guns, a pair of trail legs foldable in a common plane, a bar connecting the trail legs and foldable between said legs, and a gun-elevating mechanism including a quick-detachable coupling unit for engaging the bar.

THOMAS J. HEAVEY.